No. 664,408. Patented Dec. 25, 1900.
J. C. HENDERSON.
FILTER.
(Application filed May 4, 1900.)
(No Model.)
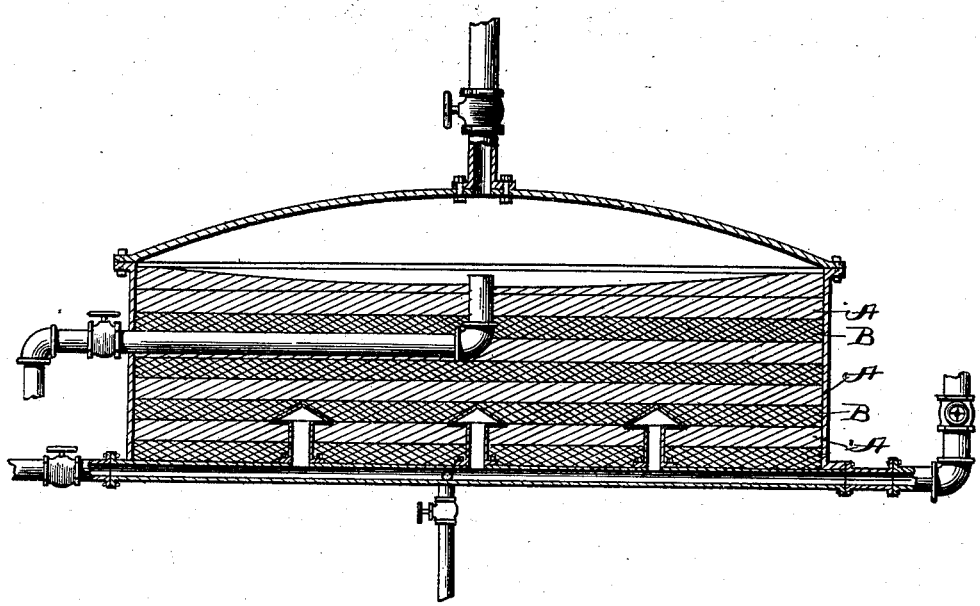
Witnesses:
J. M. Fowler Jr.
Allan W. Foote
Inventor:
John C. Henderson
by
James R. Rogers
Atty.

UNITED STATES PATENT OFFICE.

JOHN C. HENDERSON, OF NEW YORK, N. Y., ASSIGNOR TO THE MAIZE PRODUCTS COMPANY, OF SAME PLACE.

FILTER.

SPECIFICATION forming part of Letters Patent No. 664,408, dated December 25, 1900.

Application filed May 4, 1900. Serial No. 15,516. (No specimens.)

*To all whom it may concern:*

Be it known that I, JOHN C. HENDERSON, a citizen of the United States, residing at New York, in the county of New York and State of New York, have invented certain new and useful Improvements in Filters; and I do hereby declare the following to be a full, clear, and exact description of the invention, such as will enable others skilled in the art to which it appertains to make and use the same.

This invention relates to an improved composition of matter for use in filters or filtering apparatus; and some of the objects of the invention are to produce a composition of matter which will remove the foreign or extraneous matter from the material treated in the best or most satisfactory manner and to produce such a composition which will be simple and cheap.

With these and other objects in view the invention consists, essentially, in the elements combined substantially as hereinafter set forth.

The drawing illustrates alternate layers A and B, respectively, of fullers' earth and sand.

My composition for filters consists of the following ingredients, combined in the following proportions, to wit: fullers' earth, comprising solely one layer or stratum, and sand, comprising solely one layer or stratum. The layers or strata are preferably arranged in any suitable filter or filtering apparatus in alternate layers, first, beginning at the bottom with a stratum of sand; second, a layer of fullers' earth; third, a layer of sand; fourth, a layer of fullers' earth, and so on until the necessary number of layers has been provided. By this composition of matter a filtering material is produced designed to decolorize and render limpid the material treated by reason of the particular properties possessed by the elements of the composition.

If desired, in practice aluminium may be substituted for fullers' earth, and the fullers' earth and sand are used substantially in equal parts or proportions.

I do not desire to limit myself specifically to the proportions of the ingredients herein set forth, as the same may be varied in practice without departing from the spirit and scope of my invention.

What I claim is—

1. A filtering composition embodying fullers' earth and sand in alternate layers or strata.

2. A filtering composition consisting of alternate layers or strata of fullers' earth and sand in substantially equal proportions.

In testimony whereof I have hereunto affixed my signature in presence of two witnesses.

JOHN C. HENDERSON.

Witnesses:
JOHN J. ROSE,
DOUGLASS D. MACDONALD.